(12) United States Patent
Landmann

(10) Patent No.: US 10,387,352 B2
(45) Date of Patent: Aug. 20, 2019

(54) SYSTEMS AND METHODS FOR MULTIBIT CODE COMMUNICATIONS

(71) Applicant: KULITE SEMICONDUCTOR PRODUCTS, INC., Leonia, NJ (US)

(72) Inventor: Wolf Landmann, Fairlawn, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 496 days.

(21) Appl. No.: 15/162,746

(22) Filed: May 24, 2016

(65) Prior Publication Data

US 2016/0357697 A1   Dec. 8, 2016

Related U.S. Application Data

(60) Provisional application No. 62/171,378, filed on Jun. 5, 2015.

(51) Int. Cl.
*G06F 13/40* (2006.01)

(52) U.S. Cl.
CPC ...... *G06F 13/4068* (2013.01); *G06F 13/4022* (2013.01)

(58) Field of Classification Search
CPC .................. G06F 13/4068; G06F 13/4022
USPC ....................................................... 710/305
See application file for complete search history.

(56) References Cited

U.S. PATENT DOCUMENTS

| | | | | |
|---|---|---|---|---|
| 5,589,779 A * | 12/1996 | Micko | ............... | G01D 5/165 324/714 |
| 2003/0176856 A1* | 9/2003 | Howell | ............... | A61B 18/08 606/29 |
| 2005/0183047 A1* | 8/2005 | Sapiro | ............... | G06F 21/73 716/106 |
| 2010/0228893 A1* | 9/2010 | Hung | ............... | G06F 13/4068 710/16 |
| 2013/0002277 A1* | 1/2013 | Song | ............... | G01R 31/31908 324/750.3 |
| 2014/0070212 A1* | 3/2014 | Fujiwara | ............... | G06K 19/0722 257/48 |
| 2014/0215684 A1* | 8/2014 | Hardy | ............... | A41D 19/0031 2/160 |
| 2015/0220475 A1* | 8/2015 | Amarilio | ............... | H04L 61/2046 710/104 |

* cited by examiner

*Primary Examiner* — Christopher B Shin
(74) *Attorney, Agent, or Firm* — Troutman Sanders LLP; James E. Schutz; Mark Lehi Jones

(57) ABSTRACT

Certain implementations of the disclosed technology may include systems and methods for multibit code communications that can provide more than one bit per input port. In an example implementation, a method is provided that can include measuring an input voltage at an input port in communication with a device. The method can include comparing the measured input voltage with a plurality of predetermined reference voltage levels, and determining, based on the comparing, a device ID. The method can further include outputting the device ID. Certain implementations may further include compensating a signal associated with the device based on the identified device ID.

22 Claims, 9 Drawing Sheets

SYSTEMS AND METHODS FOR MULTIBIT CODE COMMUNICATIONS

RELATED APPLICATIONS

This application claims priority to U.S. Provisional Patent Application Ser. No. 62/171,378, filed on 5 Jun. 2015, entitled: "Systems and Methods for Multibit Code Communications," the contents of which are hereby incorporated by reference in their entirety as if presented herein in full.

TECHNICAL FIELD

The disclosed technology relates to device communications, and more particularly to systems and methods for multibit code communications that can provide more than one bit per pin for identifying the device.

BACKGROUND

The process of communicating information among or between electronic circuits often employs binary data formatted as multibit code. Multibit code is typically a digital arrangement or sequence of binary bits that can represent information such as numbers, characters, analog information, etc. Examples of applications that can employ multibit codes include product serial numbers, individualized device data, compensation coefficients for a specific device, last calibration date, etc. For example, sensing and measurement applications can utilize compensation coefficients to perform post-measurement adjustment of transducer signals based on temperature, pressure, manufacturing variations, etc. Such compensation coefficients are typically generated at the end of the transducer manufacturing process and can be stored with the transducer in a non-volatile memory.

Multibit code can be stored with a particular device by programming an internal Erasable and Electrically Programmable Read Only Memory (EEPROM) via a serial interface. Multibit code can also be stored external to a device, for example, on an external EEPROM. In certain applications, the (internal or external) EEPROM can be read when power is turned on, and the device can utilize the data internally, or it can be communicated externally, for compensation, etc.

In certain cases, the use of multibit code stored in an EEPROM can be either impossible or undesirable to use. One example of such a case is when the device is used in very high temperature applications, which can cause an EEPROM to operate improperly, or to fail. The use of an EEPROM may also be inappropriate for use in certain applications, such as in aircraft sensors, which can require stringent certification when memory and communication are part of the device. Such certification can be very lengthy and expensive.

When EEPROM or other memory circuits cannot be used (or are otherwise undesirable), the multibit code can be represented and communicated by utilizing several pins, which at the manufacturing stage can be individually connected either to ground or to the power supply. In this method, each pin can correspond to one bit of the code. When the pin is connected to ground, for example, the corresponding bit can represent a "zero" (0); and when the pin is connected to the power supply or left open, the corresponding bit can represent a "one" (1). The disadvantage of this method is the large number of pins on the device that may be required to represent and communicate the multibit data. Even for relatively narrow range of codes, the number of pins can be significant. For example, eight pins can be required in order to be able to represent all codes between 0 and 255.

A need exists for improved systems and methods that can enable the representation of more than one bit per pin.

BRIEF SUMMARY

Some or all of the above needs may be addressed by certain implementations of the disclosed technology. The disclosed technology includes systems and methods for multibit code communications that can provide more than one bit per pin.

In an example implementation, a system is provided. They system includes an input port having an input pin configured to couple with an identification (ID) resistor of a device; one or more comparators in communication with the input pin; a multi-tap resistive divider network comprising: three or more resistive elements configured in series; wherein a first end of the multi-tap resistive divider network is configured to be coupled to a first voltage and a second end of the multi-tap resistive divider network is configured to be coupled to a ground; a plurality of divider taps defined by the three or more resistive elements, each divider tap of the plurality of divider taps configured to generate a corresponding voltage level for communication with the one or more comparators; and a decoder circuit in communication with the one or more comparators, the decoder circuit configured to identify the device based at least in part on a comparison of an input voltage at the input pin and the voltage levels generated by the multi-tap resistive divider network, wherein the decoder circuit outputs an identification signal representative of more than one bit per input pin.

In an example implementation, a method is provided that can include receiving, at an input port in communication with an ID resistor, an input voltage corresponding to the ID resistor; generating, with a multi-tap resistive divider network, a plurality of predefined voltage levels; comparing, with one or more comparators in communication with the input port and the multi-tap resistive divider network, the input voltage with the plurality of predefined voltage levels; determining, based on the comparing, a device ID corresponding to the ID resistor; and outputting the device ID.

In another example implementation, a method is provided that can include measuring an input voltage at an input port in communication with a device; comparing the measured input voltage with a plurality of predetermined reference voltage levels; determining, based on the comparing, a device ID; and outputting the device ID.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
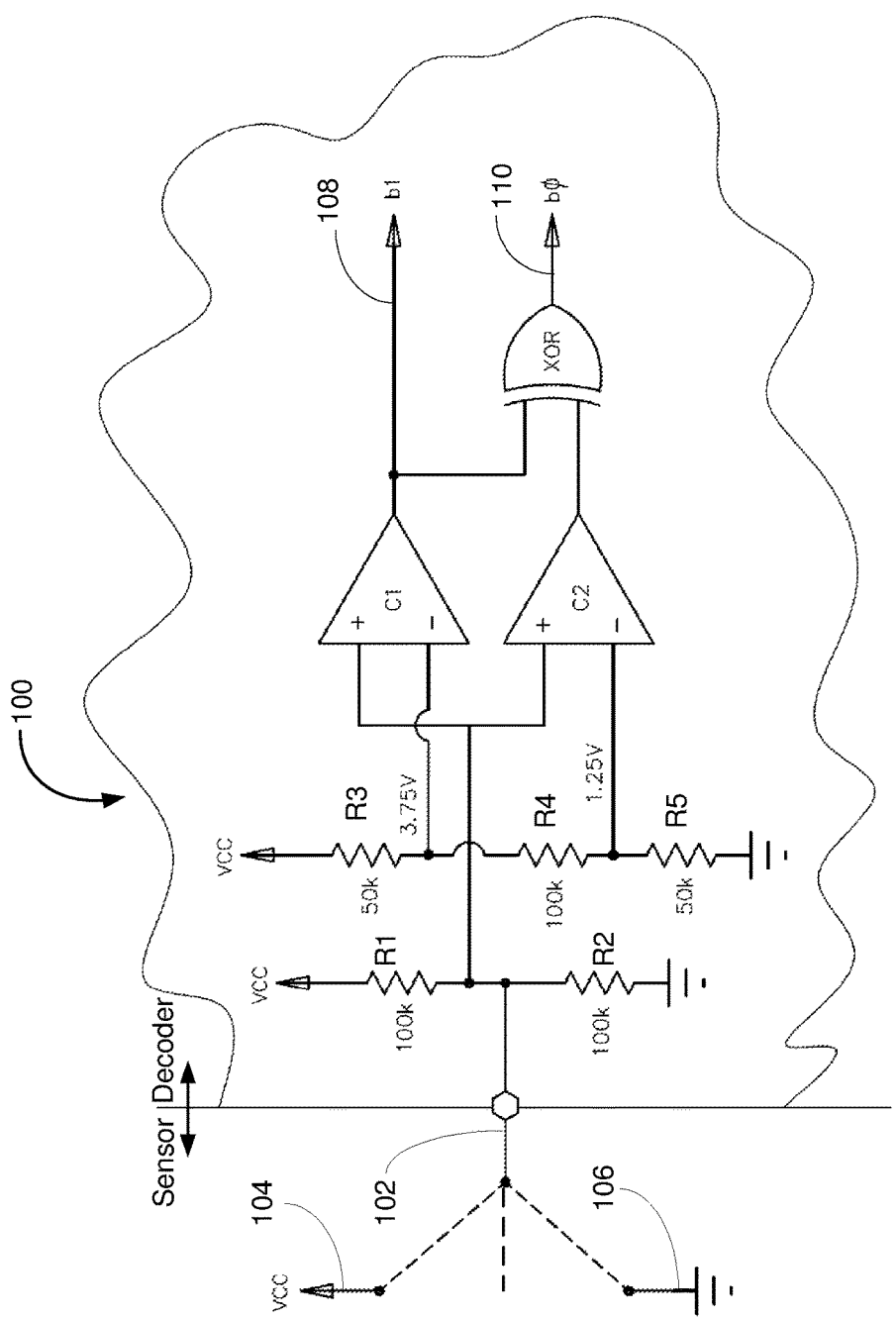
FIG. 1 is an illustrative diagram of a single input pin multibit circuit 100, according to an example implementation of the disclosed technology.

Certain implementations of the disclosed technology may allow a reduced pin count on a transducer, sensor, or other device. For example, in applications where multiple transducers are utilized to measure various pressures at different locations of a machine, where each location may be subject to a different temperature, it may be necessary or desirable to identify a particular transducer by serial number, for example, so that proper temperature or calibration compensation can be applied to the resulting measured signals. In some instances, the transducer, sensor, or other devices can be so small that the inclusion of multiple identification pins may not be practical or possible. Certain example implementations disclosed herein may enable a single output pin on the device to provide identification information that may be decoded. In certain implementations, a separate, external decoder circuit may be utilized. In other example implementations, the decoder circuit may be integrated with the device.

Although preferred embodiments of the disclosed technology are explained in detail, it is to be understood that other embodiments are contemplated. Accordingly, it is not intended that the disclosed technology is limited in its scope to the details of construction and arrangement of components set forth in the following description or illustrated in the drawings. The disclosed technology is capable of other embodiments and of being practiced or carried out in various ways. As used in the specification and the appended claims, the singular forms "a," "an," and "the" include plural referents unless the context clearly dictates otherwise.

It is intended that each term presented herein contemplates its broadest meaning as understood by those skilled in the art and may include all technical equivalents, which operate in a similar manner to accomplish a similar purpose.

Ranges may be expressed herein as from "about" or "approximately" one particular value and/or to "about" or "approximately" another particular value. When such a range is expressed, another embodiment may include from the one particular value and/or to the other particular value. Similarly, values may be expressed herein as "about" or "approximately."

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

Referring now to the drawings, in which like numerals represent like elements, exemplary embodiments of the disclosed technology are herein described. It is to be understood that the figures and descriptions of the disclosed technology have been simplified to illustrate elements that are relevant for a clear understanding, while eliminating, for purposes of clarity, other elements found in typical test assemblies. Those of ordinary skill in the art will recognize that other elements may be desirable and/or may be required in order to implement the disclosed technology. However, because such elements are well known in the art, and because they may not facilitate a better understanding, a discussion of such elements is not provided herein.

Several methods are disclosed herein that can be utilized to enable communication of more than one bit per pin. In accordance with certain example implementations of the disclosed technology, the communication of more than one bit per pin can utilize a resistor of a predetermined value connected to the pin. In another example implementation, the communication of more than one bit per pin can utilize a combination of resistors with a predetermined combined value connected to the pin. In certain example implementations, a connection to ground or to a power supply through an input ID resistor may further provide additional choices for different bit representations. Each resulting and predetermined resistance value, for example, may be associated with one code value. In an example implementation, a circuit may measure the resistance value at a pin and determine the closest predetermined value. In an example implementation, a code associated with this closest predetermined resistance value may be generated.

Certain example implementations of the disclosed technology may be used with complementary metal-oxide semiconductor (CMOS)-type integrated circuits. Certain design considerations disclosed herein may be based on the specific advantages and disadvantages of the CMOS circuits. For example, certain CMOS integrated circuits allow an easy implementation of comparators, operational amplifiers, logic circuits and analog multiplexers/switches. However, one major disadvantage of CMOS technology is that values of the on-chip resistors can have large initial tolerances. Another disadvantage of CMOS-based resistors is that the resistance values can vary with temperature due to the high thermal coefficients.

Example implementations of the disclosed technology may utilize a resistance ratio of two (or more) on-chip resistors to provide tight tolerance and consistency. In certain example implementations, the resistance ratio may be determined by the ratio of the geometric size of the resistors, which can be very consistent from chip to chip. In certain example implementations, the use of the resistance ratio of the on-chip resistors can be used to reduce the effects of temperature, particularly when the resistors are subjected to the same temperature environment.

Circuit Implementation No. 1

FIG. 1 depicts an illustrative diagram of a single-input-pin multibit circuit 100, according to an example implementation of the disclosed technology. As depicted, the circuit 100 may include a decoder section (as shown on the right side of FIG. 1) that may interface with a communication pin 102 from a sensor, transducer, component, or other device (as depicted on the left side of FIG. 1 and referred to herein as the "device"). In one example implementation, the device may be separate from, and in communication with, the decoder section. In another example implementation, the decoder may be integrated with the device. In certain example implementations, and as will be explained below with reference to FIG. 6, a single decoder section may interface with multiple devices, via a switch or multiplexer.

In accordance with an example implementation of the disclosed technology, the system 100 can include two comparators (C1 and C2), an exclusive-OR gate (XOR), an input resistive divider (R1 and R2), and a two-tap resistive divider (R3, R4 and R5). In an example implementation, the voltages generated by the two-tap divider may be utilized as thresholds for the two comparators. In certain example implementations, the voltages generated by the two-tap divider can be very stable due to the very precise ratio of the resistors, even when the actual resistor values are very different from the nominal values, and even when the individual resistance values are influenced by temperature.

The example circuit 100 may be utilized to generate three possible output states, i.e. 1½ bits for each output pin 108 110 corresponding to the voltage present at the input pin 102. The three output states at the output pins 108 110, for example, may be represented in binary code as (00), (01), or (10). In an example implementation, the first output state (00) may be produced when the input pin 102 pin is connected to ground 106. In an example implementation, the second output state (01) may be produced when the input pin 102 pin is left open (floating). In an example implementation, the third output state (10) may be produced when the input pin 102 pin is connected to the power supply Vcc 104. The three possible input connections are depicted in FIG. 1 with the dashed lines.

In accordance with certain example implementations of the disclosed technology, by using more input pins, a wider range of codes can be generated. For example, a system as disclosed herein using five input pins can be used to represent $3^5=243$ codes. This may provide a benefit over traditional methods which may require eight pins ($2^8=256$) to represent a similar number of codes. In another example implementation, a system as disclosed herein may utilize eight input pins to represent $3^8=6561$ codes, whereas a traditional method utilizing eight pins may generate only $2^8=512$ codes. Similarly, and to continue the illustrative benefits for the disclosed technology, a system as disclosed herein using 10 input pins can be used to represent $3^{10}=59049$ codes, which would require about 16 pins if the traditional implementation were utilized.

Circuit Implementation No. 2

Figure 2:
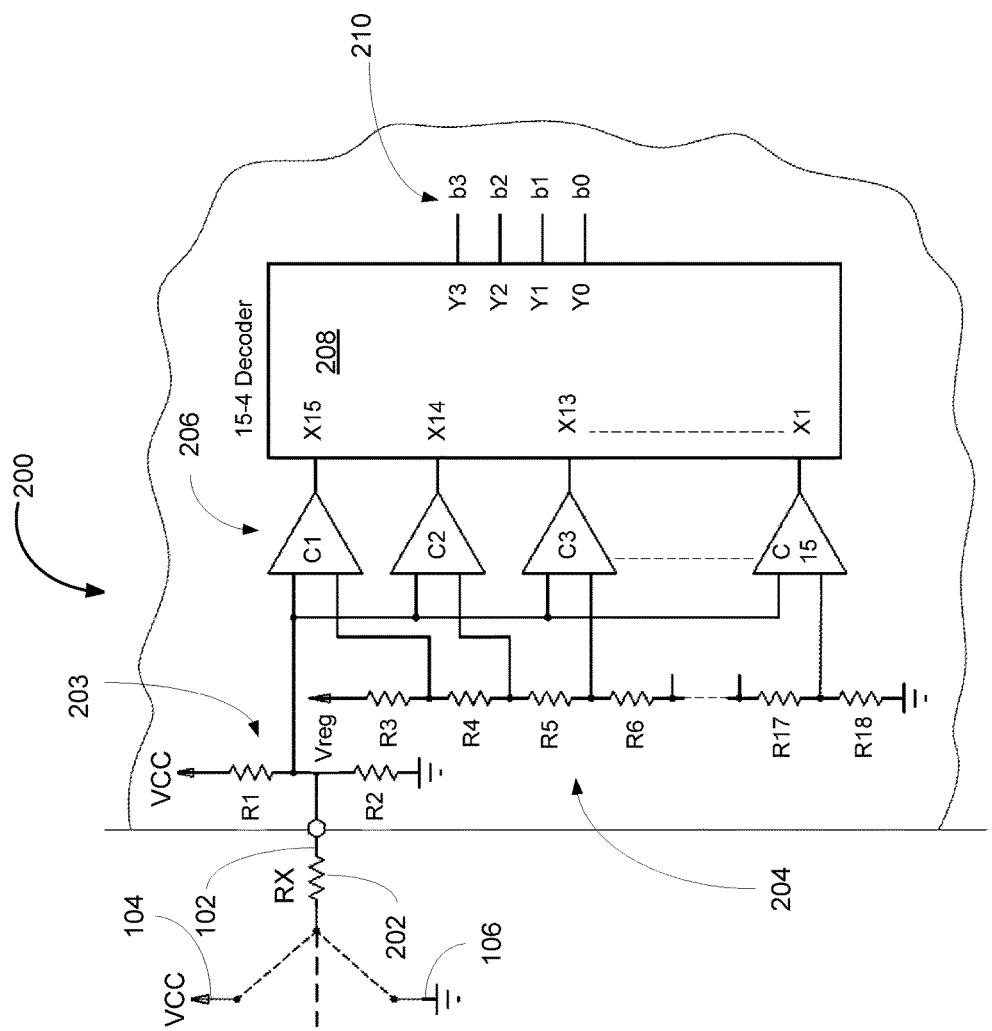
FIG. 2 is another illustrative diagram of a single input pin multibit circuit 200, according to an example implementation of the disclosed technology.

FIG. 2 depicts another illustrative diagram of a single input pin multibit circuit 200, according to an example implementation of the disclosed technology. In this disclosed implementation, the circuit 200 can include a plurality of comparators 206 (for example, 15 comparators C1 to C15 are depicted in FIG. 2), a decoder 208 (for example, a 15-to-4 decoder as depicted if FIG. 2), an input resistive divider 203 (R1 and R2, for example), and an n-tap resistive divider 204 (for example, a 15-tap resistive divider comprising R3 to R18 as depicted in FIG. 2). In an example implementation, the divided voltages generated by the n-tap resistive divider 204 may be set to correspond with the thresholds of the plurality of comparators 206.

In certain example implementations, the n-tap resistive divider 204 may be configured using resistors based on ratios (such as dimension or size ratios as previously discussed), which may provide a very stable and accurate divider network, even when the actual resistor values differ from the nominal values, and/or when the resistors are affected by temperature.

In an example implementation, the circuit 200, as shown in FIG. 2, may enable generating n-possible states (for example, 15 possible states, i.e. 3¾ bits, for each input pin 102) by the value of the input ID resistor Rx 202 and by the selection of the input connection of the input ID resistor Rx 202. In an example implementation, one end of the input ID resistor Rx 202 may be connected to the input pin 102 and the other end of the input ID resistor Rx 202 may be connected either to ground 106, to the power supply Vcc 104, or it may be unconnected, leaving the input pin 102 open (floating). In order for the circuit to easily distinguish between the n-states, and in accordance with an example implementation, the resistance value for the input ID resistor Rx 202 may be determine and selected such that the resulting voltage at the input pin 102 is separated (or offset) sufficiently from the comparator threshold voltage levels generated by the n-tap resistive divider 204 to allow a consistent state at the output of the n-comparators 206. In certain example implementations, the resistance value of input ID resistor Rx 202 may be determined and selected such that the resulting voltage at input pin 102 is set between the voltage levels generated by the n-tap resistor divider 204 with minimum upper/lower offset, for example, to avoid identification errors due to drifting device/voltage values resulting from thermal or other effects.

In accordance with an example implementation of the disclosed technology, the value of the input ID resistor Rx can be selected such the voltages generated at the input pin 102 by the combination of the divider 203 (R1 and R2) and the input ID resistor Rx are separated enough even when the resistors R1 and R2 of the input resistive divider 203 vary in a wide range. In one example implementation, the input ID resistor Rx may be selected from a number (for example, seven) possible resistance values (or ranges) and either hooked to ground 106, Vcc 104, or opened (floating) to provide the desired decoded output.

As an illustration, and with continued reference to FIG. 2, when the input pin 102 is open, the voltage at the input pin 102 will be Vcc/2 (if R1=R2) which is one of the 15 possible designed states for the voltage at the input pin 102. When the input pin 102 is shorted (i.e. Rx=0) and connected to ground 106, the voltage at the input pin 102 will be 0V, which is a second possible state from the total of 15 possible states. Another six states of the voltage at the input pin 102 correspond to six values of the input ID resistor Rx 202 that may be chosen such that the corresponding voltages generated at the input pin 102 are between 0V and Vcc/2, and separated far enough to not overlap even when the values of R1 and R2 vary in a wide range. In accordance with an example implementation of the disclosed technology, another seven states (voltages at the input pin 102) may be selected by the selected value of the input ID resistor Rx 202 and by connecting the input pin 102 through the resistor Rx 202 to Vcc 104. Assuming that the selected resistance value for the input ID resistor Rx 202 is the same as the values as above, this connection of Rx 202 to Vcc 104 may generate another seven distinct voltages between Vcc/2 and Vcc.

Table 1 below shows the nominal, minimum and maximum values of the voltage at the input pin 102, in volts, for the different values of Rx 202 and for a wide range of values for R1 and R2. The example range of the resistors R1 and R2 is between 21.13 kΩ and 65.39 kΩ, i.e. more than 3:1 ratio. This wide range is due to the large initial tolerance and large temperature effects of resistors used in CMOS circuits. The value of Vcc 104 in this example is assumed to be 5V. The seven values chosen for Rx 202 in this example, and shown in Table 1 are 0Ω (short), 680.1Ω, 2.877 kΩ, 10.04 kΩ, 33.8 kΩ, 117.9 kΩ, and 499 kΩ.

TABLE 1

| Rx | | R1, R2 | | |
|---|---|---|---|---|
| Connect to | Value | Min 21.13 kΩ | Nominal 40.24 kΩ | Max 65.39 kΩ | ΔV (mV) |
| Vcc | 0 | 5.000 | 5.000 | 5.000 | 50.9 |
| | 680.1 Ω | 4.849 | 4.918 | 4.949 | 51.0 |
| | 2.877 kΩ | 4.465 | 4.687 | 4.798 | 52.3 |
| | 10.04 kΩ | 3.781 | 4.168 | 4.412 | 52.3 |
| | 33.80 kΩ | 3.095 | 3.433 | 3.729 | 52.5 |
| | 117.9 kΩ | 2.706 | 2.864 | 3.043 | 51.8 |
| | 499 kΩ | 2.552 | 2.597 | 2.654 | 51.8 |
| | Open | 2.5 | 2.5 | 2.5 | 51.8 |
| GND | 499 kΩ | 2.448 | 2.403 | 2.346 | 51.8 |
| | 117.9 kΩ | 2.294 | 2.136 | 1.957 | 52.5 |
| | 33.80 kΩ | 1.905 | 1.567 | 1.271 | 52.3 |
| | 10.04 kΩ | 1.219 | 0.832 | 0.588 | 52.3 |
| | 2.877 kΩ | 0.535 | 0.313 | 0.202 | 51.0 |
| | 680.1 Ω | 0.151 | 0.082 | 0.051 | 50.9 |
| | 0 | 0.000 | 0.000 | 0.000 | |

Also shown in the far right-hand column of Table 1 are the potential differences ΔV, in mV, between two successive values of Rx 202, assuming Vcc=5 V. From these differences, it can be seen that the circuit can discern between the different values of Rx 202 and the different modes of connection of Rx 202.

In accordance with an example implementation of the disclosed technology, the voltages generated by the n-tap resistive divider 204 (R3 to R18) may be chosen to be the midpoints between lowest voltage in a row in Table 1 and the highest voltage in the next row. For example, the second tap voltage is set at 4.824V, which is the midpoint between 4.849V, the lowest voltage corresponding to Rx=680.1Ω connected to Vcc, and 4.798V, the highest voltage corresponding to Rx=2.877 kΩ.

In accordance with an example implementation of the disclosed technology, and with reference to FIG. 2, by using one input pin 102 and one external resistor Rx 202, 15 different codes can be generated and decoded for presentation at the output 210. In another example implementation, by using two pins, 15×15=225 codes can be generated.

Figure 3:
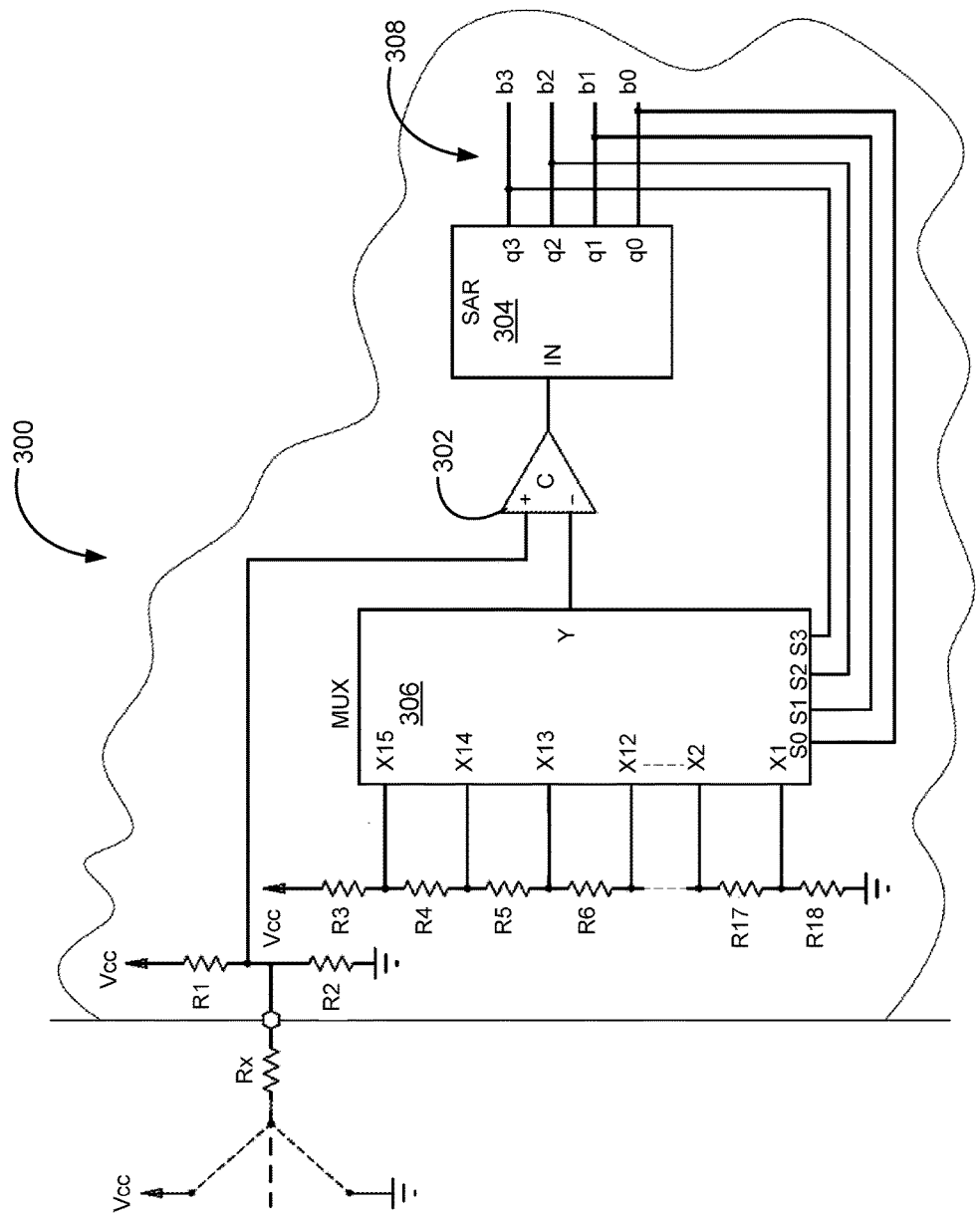
FIG. 3 is another illustrative diagram of a single input pin multibit circuit 300, according to an example implementation of the disclosed technology.

FIG. 3 is another illustrative diagram of a single input pin multibit circuit 300, according to an example implementation of the disclosed technology. This example circuit 300 is similar in operation to the previous example (circuit 200 as shown in FIG. 2) but it includes single comparator 302 that may be used to control a Successive Approximation Register (SAR) 304, which controls a Multiplexer (MUX) 306. For example, the 4 output bits 308 (b3:b0) may be generated at the output of the SAR 304 at the end of the conversion.

Circuit Implementation No. 3

Figure 4:
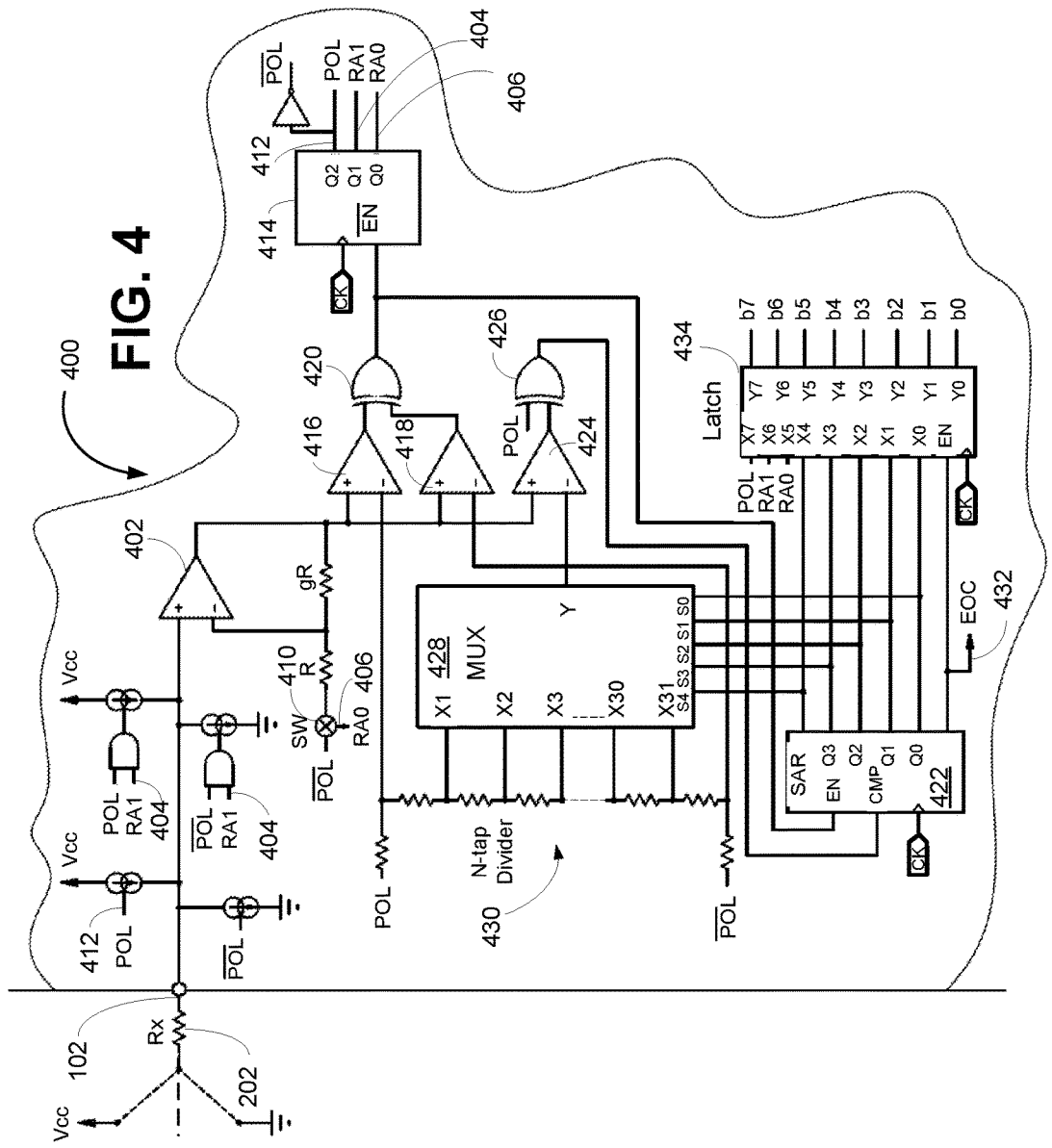
FIG. 4 is another illustrative diagram of a single input pin multibit circuit 400, according to an example implementation of the disclosed technology.

FIG. 4 is another illustrative circuit diagram of a single input pin multibit circuit 400, according to an example implementation of the disclosed technology.

In accordance with an example implementation of the disclosed technology, a larger number of codes per input pin 102 are possible by measuring the input ID resistor Rx 202 with a sufficient accuracy, which will allow selecting a relatively large number of values for the input ID resistor Rx 202. In accordance with an example implementation of the disclosed technology, the measurement accuracy plus the tolerance of the input ID resistor Rx 202 should preferably be less than half the difference between two successive nominal values of the input ID resistor Rx 202.

The disclosed circuit 400 is designed to operate with 128 predetermined possible values of the input ID resistor Rx 202. In an example implementation, the circuit 400 may determine the value of the input ID resistor Rx 202 and may also determine the connection of the input ID resistor Rx 202 (to ground or to Vcc). As a result, an example implementation of the circuit 400 may be utilized to generate 256 possible codes, i.e. 8 bits using a single input pin.

In an example implementation, the 128 values for the input ID resistor Rx 202 may be chosen between 60.4Ω and 499 kΩ, and divided into 4 ranges of 32 values each. In one example implementation, the first range may be between 499 kΩ and 60.4Ω, the second range between 49.9 kΩ and 6.04 kΩ, the third range between 4.99 kΩ and 604Ω, and the fourth range between 499Ω and 60.4Ω. Other ranges may be selected without departing from the scope of the disclosed technology.

In an example implementation, the circuit 400 may measure the voltage generated across the input ID resistor Rx 202 when a current source is applied to the input ID resistor Rx 202. According to one example implementation of the disclosed technology, the values for the current source may be selected (for example, as 8 μA and 800 μA). In this example implementation, the voltage across the input ID resistor Rx 202 may be passed through an amplifier 402 with a gain of 1 or 10. Also, the current sources of 8 μA and 800 μA can be either sink or source, thus allowing to determine the actual connection of the input ID resistor Rx 202 to either ground or Vcc.

In accordance with an example implementation of the disclosed technology, the value of the current source (8 μA or 800 μA) may be controlled by a bit RA1 404. The gain of 1 or 10 of the amplifier 402 may be controlled by the bit RA0 406 through the solid-state switch SW 410. In an example implementation, a bit POL 412 may control the direction of the current source (sink or source). These three bits, RA0 406, RA1 404 and POL 412, may be generated by a three bit counter 414. In an example implementation, the counter 414 may advance through all possible states until the correct state is reached. In an example implementation, when correct state is reached, is can be detected by the two comparators C1 416 and C2 418, which may determine if the output voltage of the amplifier 402 is either between 0.414V and 4.1V above GND, or between 0.414V and 4.1V below Vcc. The correct state of the 3-bit counter 414 may indicate the correct range of the input ID resistor Rx 202 (bits RA0 406, RA1 404, and the connection of the input ID resistor Rx 202 to either Vcc (bit POL 412=0) or to GND (bit POL 402=1).

In accordance with an example implementation of the disclosed technology, when the output of the exclusive-OR gate 420 is HIGH, this may indicate that the 3-bit counter 414 has reached the correct state. In this state, the bits RA0 406, RA1 404 reflect the correct range of input ID resistor Rx 202, and the bit POL 412 indicates the connection of the input ID resistor Rx 202 either to Vcc (POL 412=0) or to GND (POL 412=1). When this state is reached, the 3-bit counter may cease to advance.

At the same time, and in an example implementation, when the output of the exclusive-OR gate 420 is HIGH, the Successive Approximation Register (SAR) 422 starts operating. The operation of the SAR 422 may be controlled by the comparator C3 424 and gate XOR2 426. In an example implementation, the 5 bits outputs of the SAR 422 may control the multiplexer MUX 428. The MUX 428 selects one of the 31 taps of a resistive divider 430, which is applied to the reference input of the comparator 424 and compared with the output of the amplifier 402.

In an example implementation, the signal End of Conversion EOC 432 indicates when the conversion is complete, at which point the output bits of the 3-bit counter 414 (RA0, RA1 and POL) and the 5 bits of the SAR 422 are latched in the 8-bit latch 434. In an example implementation, the 8 outputs of the latch 434 (b7:b0) may indicate the state associated with the value of the input ID resistor Rx 202 and the connection of the input ID resistor Rx 202 to either Vcc or to GND.

Circuit Implementation No. 4

Figure 5:
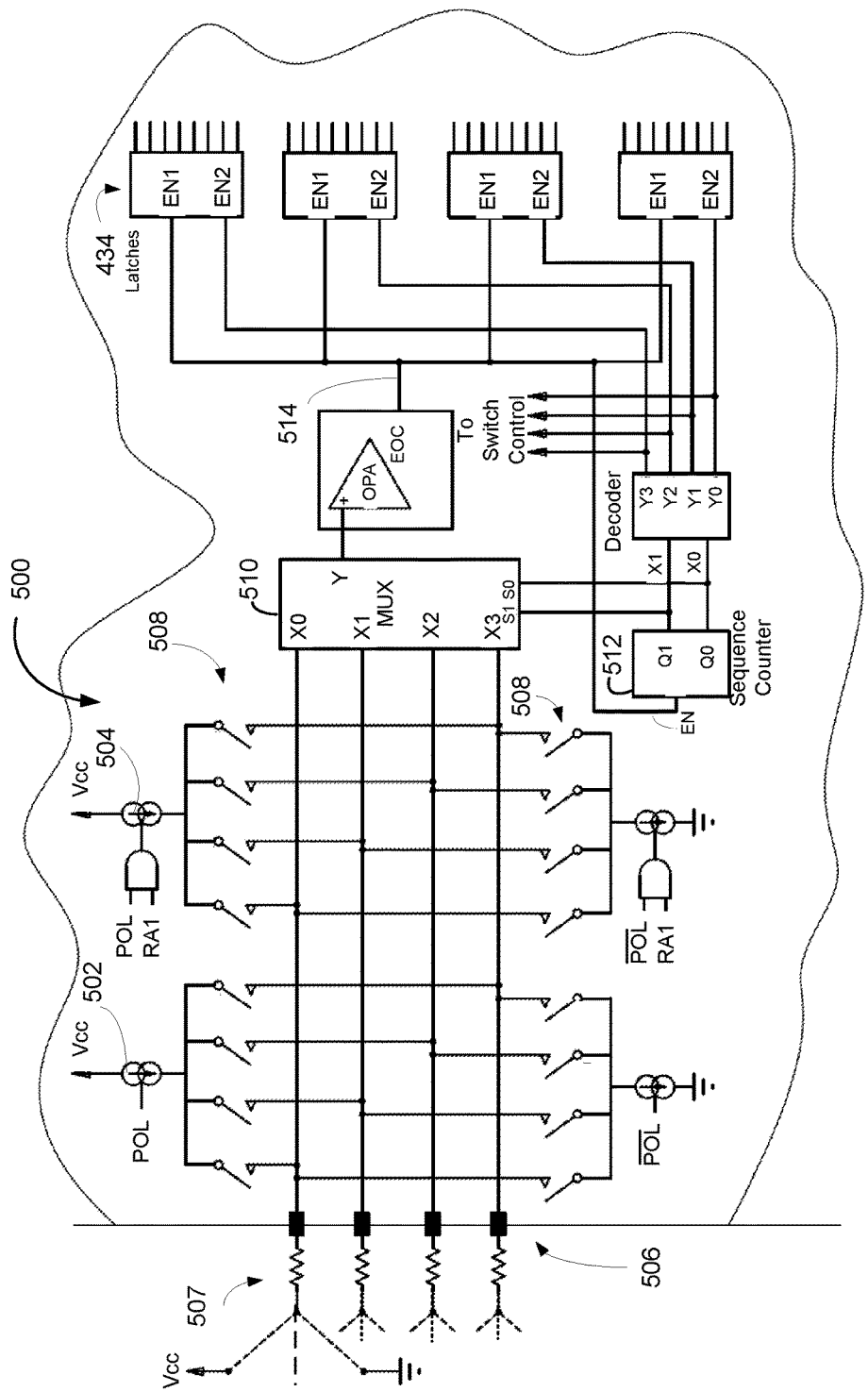
FIG. 5 is an illustrative diagram of another multibit circuit 500, according to an example implementation of the disclosed technology.

FIG. 5 is an illustrative diagram of another multibit circuit 500, according to an example implementation of the disclosed technology. This example multibit circuit 500 may be utilized if more than 8 identifying bits are needed, and may implemented by using more than one input pin. The circuit 500 depicted in FIG. 5 shows the implementation for four input pins 506, thus generating 32 bits.

In this circuit 500, and according to an example implementation, the 8 μA 502 current source and an 800 μA 504 current source may be switched to one of the four input pins 506 by the switches SW1 through SW16 508. In an example implementation, the four input pins 506 may be successively applied to a Measuring Circuit through an Analog Multiplexer 510. The switches SW1 through SW16 508 and the Analog Multiplexer 510 may be controlled by a 2 bit Sequence Counter 512.

In an example implementation, the Measuring Circuit referenced above may be similar or the same as the one shown and described above with reference to FIG. 4, except that the 8 bit latch 434 may be repeated four times.

In an example implementation, the Sequence Counter 512 may advance through all of its four states. In each state, one of the corresponding input pins 506 and the associated input ID resistor Rx 507 may be evaluated. At the end of the conversion, as indicated by the signal EOC 514, the 8 bits generated by the Measuring Circuit may be stored in the corresponding 8-bit latch 434 and the Sequence Counter 512 may be advanced to the next state.

Figure 6:
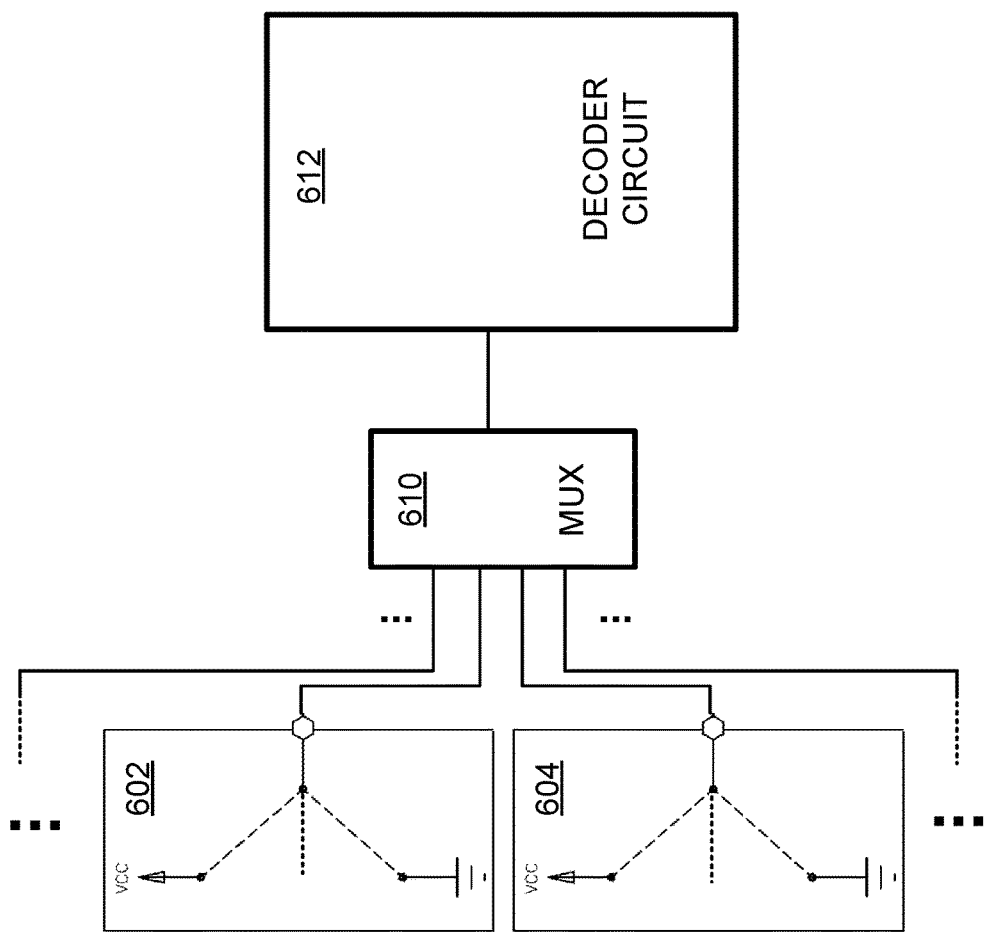
FIG. 6 is an illustrative block diagram of a system for decoding multiple devices using a multiplexer, according to an example implementation of the disclosed technology.

FIG. 6 depicts a block diagram of an example system that may be utilized for decoding multiple devices 602, 604, etc., using a multiplexer 610 or similar switching circuit. In certain example implementations, the multiplexer 610 may be utilized to select a particular device of the multiple devices 602, 604 and route the selected input signal to the decoder circuit 612. Certain example implementations of the multiplexing arrangement as shown in FIG. 6 may be utilized to reduce the number of circuits needed, for example, so that a given decoder circuit 612 may be used for decoding multiple devices.

Generalized Circuit Implementation

Figure 7:
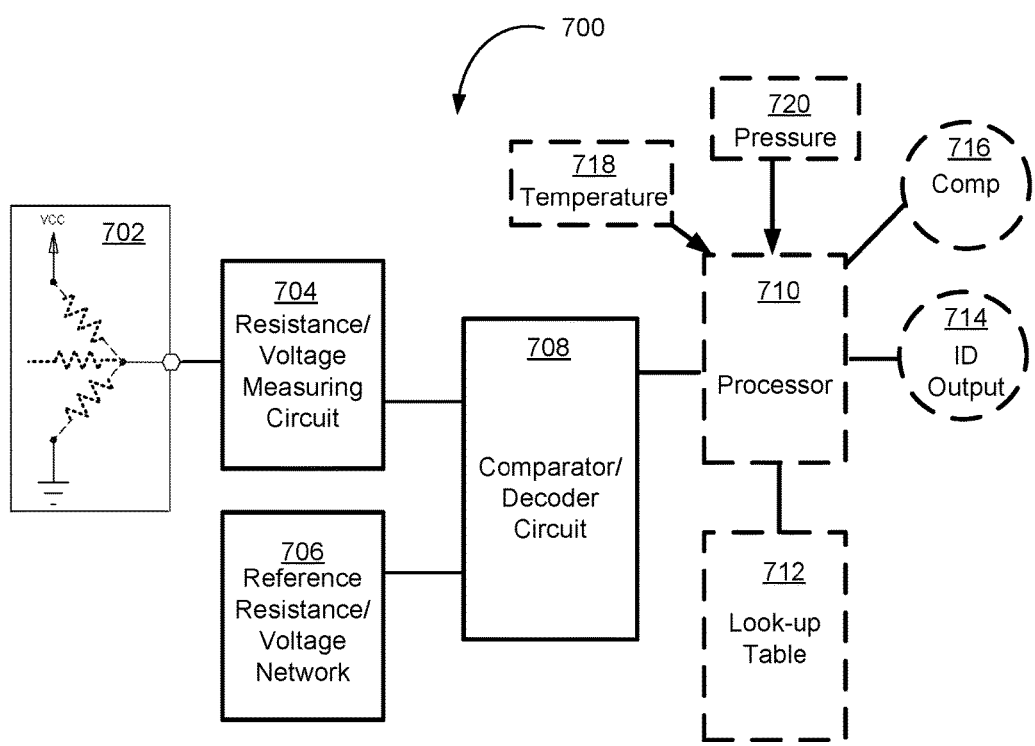
FIG. 7 is an illustrative generalized block diagram of a system 700 for detecting and decoding a device ID, according to an example implementation of the disclosed technology.

FIG. 7 is an illustrative generalized block diagram of a system 700 for detecting and decoding a device ID, according to an example implementation of the disclosed technology. As previously discussed with regard to FIGS. 1-6, in certain embodiments the device 702 may be connected to an input port of a resistance/voltage measuring circuit 704. In one example implementation, the device 702 can be an external device. In another example implementation, the device 702 can be integrated with the rest of the system 700.

In certain example implementations, a predetermined ID resistor can be installed in the device 702 and the ID resistor can be connected to either ground, a predetermined reference voltage (Vcc), or left floating (or not installed). In certain example implementations, the predetermined reference voltage (Vcc) may also be utilized by (or supplied by) the system 700, for example, so that any drifting or change in this voltage may simultaneously be reflected at the voltage at the input port to the resistance/voltage measuring circuit 704, and any voltage ratios (for example, as supplied by the reference resistance/voltage network 706) may be equally affected so that the comparisons by the comparator/decoder circuit 708 is relatively unaffected by a drifting reference voltage.

As previously discussed, the comparator/decoder circuit 706 may receive a voltage from the resistance/voltage measuring circuit 704, as a function of its interaction with the ID resistor installed in the device 702. This voltage may be compared with a plurality of voltages generated by the reference resistance/voltage network 706, and based on the comparison, the comparator/decoder circuit 706 may produce a digital representation of the ID associated with the device 702.

In certain example implementations, a processor 710 may receive the digital representation of the device 702 identification, as produced by the comparator/decoder circuit 706, and the processor 710 may access a lookup table 712 to determine further information. For example, in an implementation, the processor 710 may access the lookup table 712 to obtain and output a device ID 714, such as a serial number. In certain example implementations, the processor 710 may access the lookup table 712 to obtain corresponding compensation 716, for example, to be applied to a signal associated with the device 702. In one example implementation, the compensation 716 may be based on a measured temperature 718. In another example implementation, the compensation 716 may be based on a measured pressure 720. In yet other example implementations, the compensation 716 may based on the ID of the device 702.

As may be appreciated by those having ordinary skill in the art, the identification of a particular device (from a plurality of devices) based on a single ID resistor installed with the device may provide an increased reliability, particularly in certain applications where EEPROMs are not appropriate or tolerated. Furthermore, many post-processing steps, such as temperature and/or pressure compensation may be performed based on the identification of the device. Thus, the post-processing examples provided herein are illustrative and not intended to limit the scope of the disclosed technology.

Figure 8:
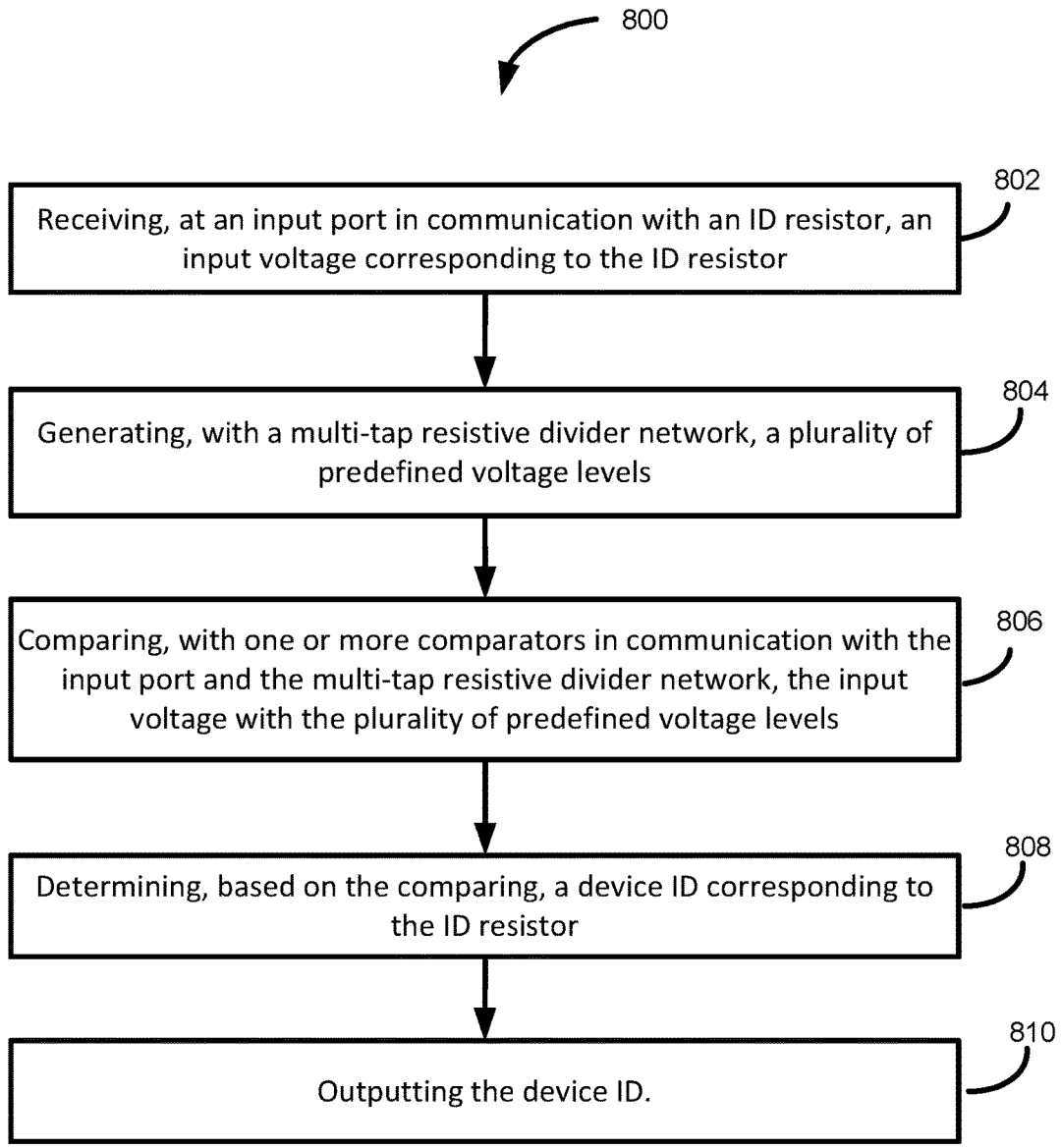
FIG. 8 is a flow diagram of a method 800, according to an example implementation of the disclosed technology.

FIG. 8 is a flow diagram that depicts a method 800, according to an example implementation of the disclosed technology. At block 802, the method 800 includes receiving, at an input port in communication with an ID resistor, an input voltage corresponding to the ID resistor. At block 804, the method 800 includes generating, with a multi-tap resistive divider network, a plurality of predefined voltage levels. At block 806, the method 800 includes comparing, with one or more comparators in communication with the input port and the multi-tap resistive divider network, the input voltage with the plurality of predefined voltage levels. At block 808, the method 800 includes determining, based on the comparing, a device ID corresponding to the ID resistor. At block 810, the method 800 includes outputting the device ID.

Figure 9:
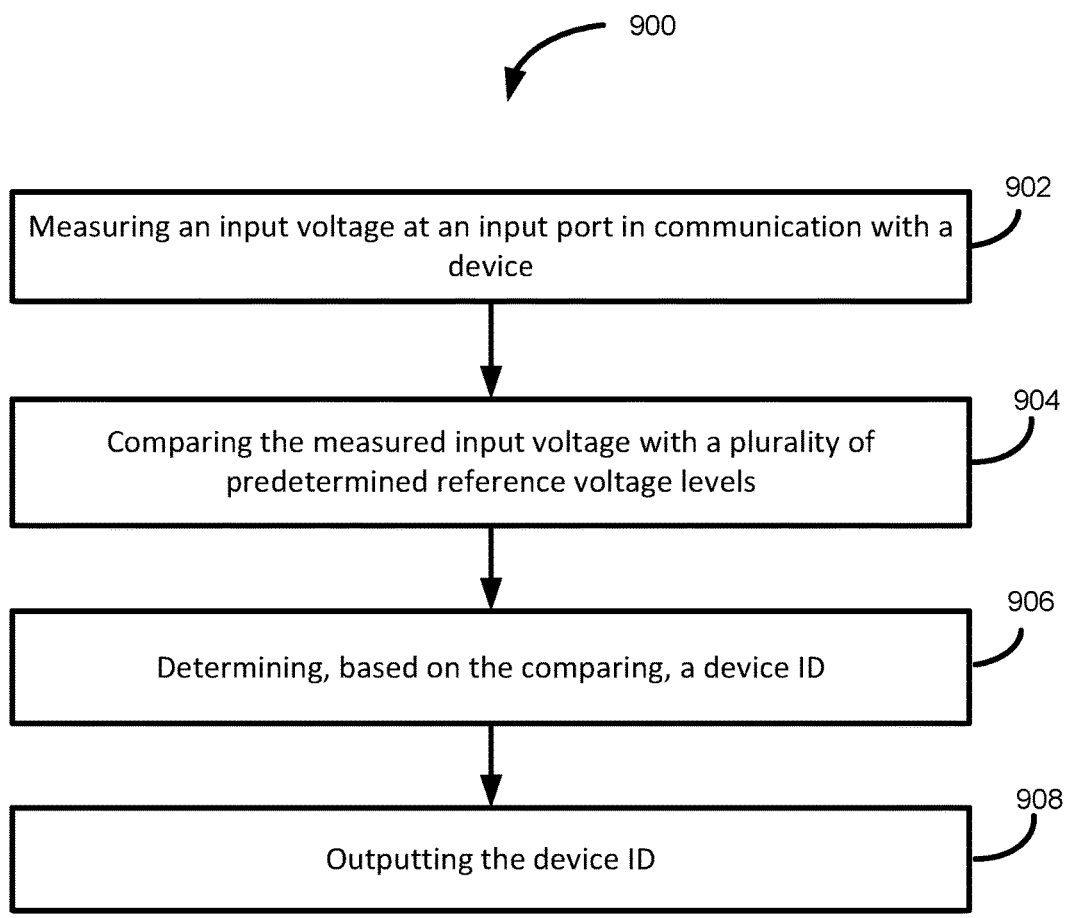
FIG. 9 is a flow diagram of a method 900, according to an example implementation of the disclosed technology.

FIG. 9 is a flow diagram that depicts a method 900, according to an example implementation of the disclosed technology. At block 902, the method 900 includes measuring an input voltage at an input port in communication with a device. At block 904, the method 900 includes comparing the measured input voltage with a plurality of predetermined reference voltage levels. At block 906, the method 900 includes determining, based on the comparing, a device ID. At block 908, the method 900 includes outputting the device ID.

In an example implementation, the input voltage at the input port corresponds to an ID resistor associated with the device. According to an example implementation of the disclosed technology, the device may be an external device.

In certain example implementations, comparing the measured input voltage with the plurality of predetermined reference voltage levels can include generating, with a multi-tap resistive divider network, the plurality of predetermined reference voltage levels; and comparing, with one or more comparators in communication with the input port and the multi-tap resistive divider network, the input voltage with the predetermined reference voltage levels.

In some implementations, determining the device ID can include accessing a lookup table, for example, with a processor.

According to an example implementation of the disclosed technology, the methods disclosed herein can further include applying, based on the determined device ID, one or more post-measurement adjustments to a signal received from the device. For example, certain implementation may include applying one or more post-measurement adjustments based on one or more of temperature, pressure, manufacturing run, serial number, and any other information associated with the device ID.

In certain example implementations, determining the device ID can include generating a device identification signal capable of representing more than one bit per input port.

Certain example implementations include providing a voltage source and ground to the device. In certain example implementations, an ID resistor may be installed in the device. Certain example implementations can include connecting the ID resistor to the voltage source or the ground.

According to an example implementation of the disclosed technology, the multi-tap resistive divider network can include three or more resistive elements configured in series; wherein a first end of the multi-tap resistive divider network is configured to be coupled to a voltage source and a second end of the multi-tap resistive divider network is configured to be coupled to a ground, wherein a plurality of divider taps defined by the three or more resistive elements is configured to generate a corresponding voltage level for communication with the one or more comparators.

In accordance with an example implementation of the disclosed technology, outputting the device ID can include outputting a digital representation of the device ID.

Certain example implementations can include configuring the three or more resistive elements of the multi-tap resistive divider network based on a geometric sizes.

According to an example implementation of the disclosed technology, any of the resistive elements disclosed herein may be manufactured by a CMOS process.

Certain example implementations can include a input resistive divider network having a first resistor, a second resistor connected in series with the first resistor at a center tap, the center tap coupled to the input pin, a first end of the first resistor configured to be coupled to the first voltage; and a second end of the second resistor configured to be coupled to the ground.

Certain example implementations can include an output port in communication with the decoder circuit, wherein the decoder circuit outputs to the output port, a digital representation of the device identification based on the ID resistor.

In certain example implementations, the resistive elements of the a multi-tap resistive divider network are CMOS resistors, and wherein voltages at the plurality of divider taps are configured, at least in part, by resistance ratios of the resistive elements. In certain example implementations, the resistance ratios are based on geometric sizes of the resistive elements.

In certain example implementations, the resistive elements of the multi-tap resistive divider network are predefined based on a selection of ID resistor values to generate the corresponding voltage level within a predefined range of corresponding nominal voltage values. In an example implementation, the range can include an upper and lower voltage value.

According to an example implementation of the disclosed technology, the input resistive divider network can include CMOS resistors. In certain example implementations, the resistors are defined based on geometric sizes of the resistors.

In accordance with an example implementation of the disclosed technology, the input port may be configured to provide the first voltage and the ground to the device.

In certain example implementations, the decoder circuit can include a multiplexer in communication with the one or more comparators. In certain example implementations, the decoder circuit can include a successive approximation register in communication with the one or more comparators.

According to an example implementation of the disclosed technology, the device is integrated with the system. In certain example implementations, the device is external to the decoder system.

In certain example implementations, the device is a sensor. In certain example implementations, the device is a pressure sensor.

According to an example implementation of the disclosed technology, the system may also include signal paths for conducting or transmitting a sensor signal from the device.

Certain implementations of the disclosed technology may include systems and methods for multibit code communications that can provide more than one bit per input port. In an example implementation, a method is provided that can include: receiving, at an input port in communication with an ID resistor, an input voltage corresponding to the ID resistor; generating, with a multi-tap resistive divider network, a plurality of predefined voltage levels; comparing, with one or more comparators in communication with the input port and the multi-tap resistive divider network, the input voltage with the plurality of predefined voltage levels; determining, based on the comparing, a device ID corresponding to the ID resistor; and outputting the device ID.

Certain example implementation of the disclosed technology may provide the technical effects and/or benefits of providing reliable identification information of a device (such as a sensor) without requiring complex circuitry to be installed in the device. In certain example implementations, external decoding circuitry may be connected to the device to identify the device for providing one or more of device requirements (voltage, current, biasing, frequency, etc.)

compensation coefficients for post-measurement adjustment of received signals based on temperature, pressure, manufacturing variations, etc.

Numerous characteristics and advantages have been set forth in the foregoing description, together with details of structure and function. While the disclosed technology has been presented in several forms herein, it may be apparent to those skilled in the art that many modifications, additions, and deletions, especially in matters of shape, size, and arrangement of parts, can be made therein without departing from the spirit and scope of the disclosure and its equivalents as set forth in the following claims. Therefore, other modifications or embodiments as may be suggested by the teachings herein are particularly reserved as they fall within the breadth and scope of the claims.

The invention claimed is:

1. A system, comprising:
    an input port having an input pin configured to couple with an identification (ID) resistor of a sensor device;
    a multiplexer;
    a single comparator having a first input in communication with the input pin and a second input in communication with an output of the multiplexer;
    a multi-tap resistive divider network comprising:
        three or more resistive elements configured in series; wherein a first end of the multi-tap resistive divider network is configured to be coupled to a first voltage and a second end of the multi-tap resistive divider network is configured to be coupled to a ground;
        a plurality of divider taps defined by the three or more resistive elements, each divider tap of the plurality of divider taps configured to generate a corresponding voltage level for communication with corresponding inputs of the multiplexer; and
    a successive approximation register (SAR) having an input in communication with and configured to be controlled by an output of the single comparator, the SAR having a plurality of outputs in communication with and configured to control the multiplexer, wherein the plurality of outputs of the SAR are configured to identify the sensor device based at least in part on a comparison of an input voltage at the input pin and the voltage levels generated by the multi-tap resistive divider network, wherein the SAR outputs an identification signal representative of more than one bit per input pin.

2. The system of claim 1, further comprising an input resistive divider network having:
    a first resistor;
    a second resistor connected in series with the first resistor at a center tap, the center tap coupled to the input pin;
    a first end of the first resistor configured to be coupled to the first voltage; and
    a second end of the second resistor configured to be coupled to the ground.

3. The system of claim 1, further comprising an output port in communication with the plurality of outputs of the SAR, wherein the SAR outputs to the output port, a digital representation of the device identification based on the ID resistor.

4. The system of claim 1, wherein the three or more resistive elements of the multi-tap resistive divider network are CMOS resistors, and wherein voltages at the plurality of divider taps are configured, at least in part, by resistance ratios of the three or more resistive elements.

5. The system of claim 4, wherein the resistance ratios are based on geometric sizes of the three or more resistive elements.

6. The system of claim 1, wherein the three or more resistive elements of the multi-tap resistive divider network are predefined based on a selection of ID resistor values to generate the corresponding voltage level within a predefined range of corresponding nominal voltage values.

7. The system of claim 6, wherein the predefined range comprises an upper and lower voltage value.

8. The system of claim 2, wherein the first and second resistors of the input resistive divider network are CMOS resistors, and wherein first and second resistors are defined based on geometric sizes of the first and second resistors.

9. The system of claim 1, wherein the input port is further configured to provide the first voltage and the ground to the device.

10. The system of claim 1, wherein the sensor device is integrated with the system.

11. A method, comprising:
    receiving, at an input port in communication with an ID resistor of a sensor device, an input voltage corresponding to the ID resistor;
    generating, with a multi-tap resistive divider network, a plurality of predefined voltage levels;
    providing the plurality of the predefined voltage levels to corresponding inputs of a multiplexer;
    controlling, by a successive approximation register (SAR), the multiplexer to output a selected one of the plurality of predefined voltage levels, wherein the SAR is configured with an input in communication with and configured to be controlled by an output of a single comparator, the SAR having a plurality of outputs in communication with and configured to control the multiplexer;
    comparing, with the single comparator, the input voltage and the output of the multiplexer;
    determining, based on the plurality of outputs of the SAR, a device ID corresponding to the ID resistor; and
    outputting the device ID.

12. The method of claim 11, wherein determining the device ID comprises generating a device identification signal capable of representing more than one bit per input port.

13. The method of claim 11, further comprising providing a voltage source and ground to the sensor device, wherein installing the ID resistor in the device comprises connecting the ID resistor to the voltage source or the ground.

14. The method of claim 11, wherein the multi-tap resistive divider network comprises three or more resistive elements configured in series; wherein a first end of the multi-tap resistive divider network is configured to be coupled to a voltage source and a second end of the multi-tap resistive divider network is configured to be coupled to a ground, wherein a plurality of divider taps defined by the three or more resistive elements is configured to generate a corresponding voltage level for communication with the multiplexer.

15. The method of claim 11, wherein outputting the device ID comprises outputting a digital representation of the device ID.

16. The method of claim 11, further comprising configuring the three or more resistive elements of the multi-tap resistive divider network based on geometric sizes.

17. The method of claim 11, further comprising manufacturing the three or more resistive elements by a CMOS process.

18. A method comprising:
measuring an input voltage at an input port in communication with a sensor device;
comparing the measured input voltage with a plurality of predetermined reference voltage levels, wherein comparing the measured input voltage with the plurality of predetermined reference voltage levels comprises:
generating, with a multi-tap resistive divider network, the plurality of predetermined reference voltage levels;
providing the plurality of the predetermined reference voltage levels to corresponding inputs of a multiplexer;
controlling, by a successive approximation register (SAR), the multiplexer to output a selected one of the plurality of predetermined reference voltage levels, wherein the SAR is configured with an input in communication with and configured to be controlled by an output of a single comparator, the SAR having a plurality of outputs in communication with and configured to control the multiplexer; and
comparing, with the single comparator, the input voltage and the output of the multiplexer;
determining, based on the comparing, a device ID; and outputting the device ID.

19. The method of claim 18, wherein the input voltage at the input port corresponds to an ID resistor associated with the sensor device.

20. The method of claim 18, wherein determining the device ID comprises accessing a lookup table.

21. The method of claim 18, further comprising applying, based on the determined device ID, one or more post-measurement adjustments to a signal received from the device.

22. The method of claim 21, wherein applying the one or more post-measurement adjustments is further based on one or more of temperature and pressure.

* * * * *